(No Model.)
L. B. & C. H. SPROUT.
GRINDING MILL.
No. 346,511. Patented Aug. 3, 1886.
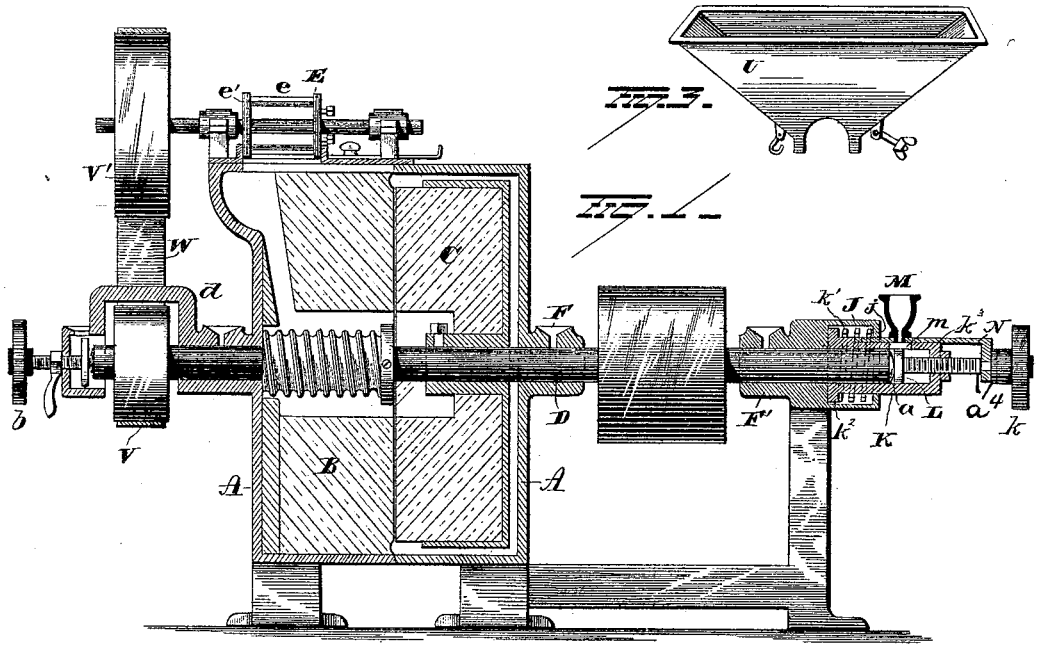
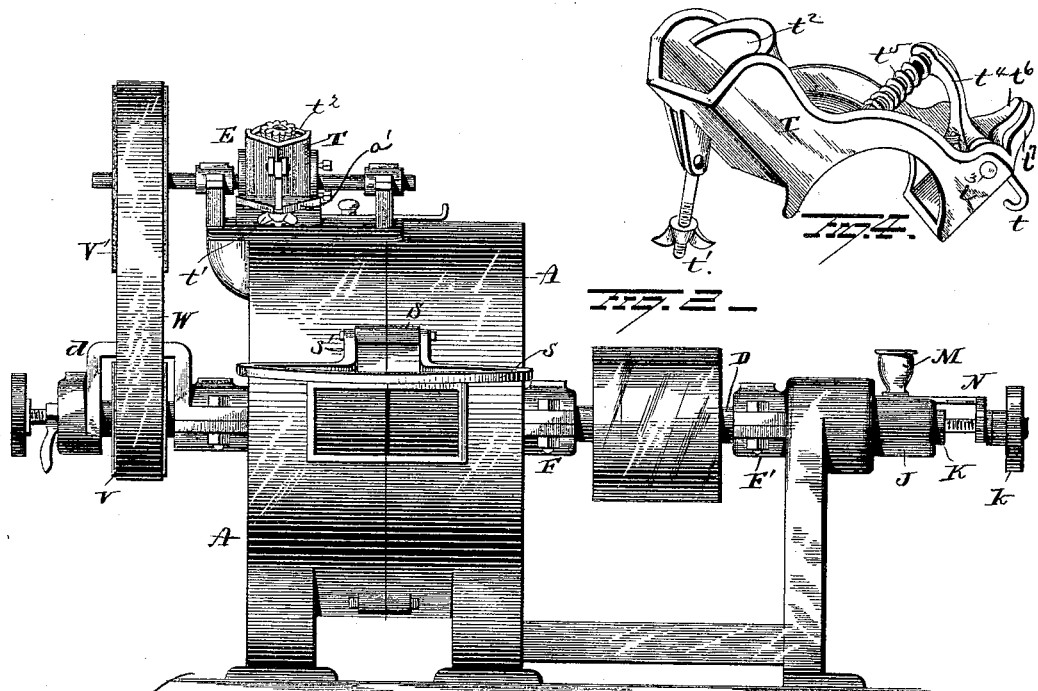
WITNESSES
INVENTOR
L. B. Sprout
C. H. Sprout
By Leggett & Leggett
Attorney

UNITED STATES PATENT OFFICE.

LEWIS B. SPROUT AND CHARLES H. SPROUT, OF MUNCY, PENNSYLVANIA.

GRINDING-MILL.

SPECIFICATION forming part of Letters Patent No. 346,511, dated August 3, 1886.

Application filed March 15, 1886. Serial No. 195,309. (No model.)

*To all whom it may concern:*

Be it known that we, LEWIS B. SPROUT and CHARLES H. SPROUT, of Muncy, in the county of Lycoming and State of Pennsylvania, have invented certain new and useful Improvements in Grinding-Mills; and we do hereby declare the following to be a full, clear, and exact description of the invention, such as will enable others skilled in the art to which it appertains to make and use the same.

Our invention relates to improvements in grinding-mills; and it consists in certain features of construction and combinations of parts, as will be hereinafter described, and pointed out in the claims.

In the accompanying drawings, Figure 1 is a vertical longitudinal section of the mill. Fig. 2 is a front view, showing the supporting-ring and hopper in position, and Figs. 3 and 4 are detached views of the hoppers.

A represents the cylindrical shell which incloses the burrs B and C, the former of which is secured in a fixed position within the shell, and the latter is secured to the spindle D and allowed to rotate within the casing. A small hopper, T, is placed over the knives $e$, secured between the cutter-heads E and $e'$, and is secured in position on the casing A by the thumb-screw $t'$, engaging a projection, $a'$, of the casing, and the hook $t$, engaging a corresponding projection on the opposite side of the casing. The cap $t^2$, for the hopper, and also for the knives, which rotate within the hopper, is attached at one end to said hopper by the bolt $t^3$, and on the same bolt is loosely secured the spring-holder $t^4$. This holder is provided at its lower end with a projection, $t^6$, adapted to abut against the projection $t^7$ of the hopper T, and prevent the holder $t^4$ from moving rearwardly. A coiled spring, $t^5$, is interposed between the end of the holder $t^4$ and the upper face of the cap $t^2$, and yieldingly holds the side edges of the cap in contact with the hopper. The hopper and cap are both preferably constructed V shape in cross-section, for the purpose of holding different sizes of ears of corn firmly in position to be acted upon by the cutter-head; but they might be constructed in circular, hexagonal, or other shape, if so desired, and the spring is not absolutely essential to the operation of the hopper and cutter, but it is found preferable in practice, as it affords a yielding cushion that exerts a steady and constant pressure on ears of different sizes. The cutter is located immmediately beneath the hopper T, in the passage leading to the screw-feed, and consists of a set of knives, $e$, secured to the revolving heads $e'$ and E, the path of the knives being transverse to the throat of the hopper T. Thus the ears of corn, as they are fed lengthwise through the hopper, are sliced off by the knives and pass onto the grinding-burrs in a finely-subdivided state.

When loose grain is to be ground, the hopper T is removed and its place supplied by a large hopper, U, of ordinary construction. When the latter is brought into use, the cutter-head and knives engage the grain at the base of the hopper U, and act as a force-feed for delivering the grain to the burrs.

The burr-spindle D has suitable bearings in the supporting-frame at points F F', and in a yoke, $d$, attached to the shell about the stationary burr.

The end $a$ of the spindle D has a bearing, L, in the oil-box K. The bearing L is adapted to be moved within the oil-box K by an adjusting-screw, $k$, which works in a threaded perforation in the end of said box. The box K has a longitudinally-sliding adjustment within an outer box, J, a stiff spiral spring, $k'$, being inserted between an outwardly-extending flange, $k^2$, on the end of the box K toward the burrs and an inwardly-extending flange, $j$, on the end of the box J away from the burrs. The spring $k'$ tends to hold the burr C in contact with the burr B, and its tension, as will be readily seen, is regulated by the screw $k$. The cushioning of the spindle D, by means of the spiral spring between the boxes K and J, serves to allow the burrs to yield when any hard substance gets between them. In the top of the box K is a groove or channel, $k^3$, in which a bar or plate, N, is adapted to fit and slide. The outer end of the bar or plate N is bent downwardly, or is provided with a depending arm, as shown, which loosely embraces the stem of the screw $k$, but is held against a sliding movement on the stem of the screw by shoulders or stops $a^4$ thereon. An oil-cup, M, is attached to the bar or plate N at a point over the bearing L, and by means of an elongated slot, $m$, in the box K is adapted to feed oil to the bearing of the end $a$ of the spindle in the oil-box.

The attachment of the bar or plate N to the screw k serves to adjust the oil-cup simultaneously with the bearing and causes it to feed oil directly thereto, in whatever position the bearing may be.

The yoke, arch, or U-shaped guard d is attached at one end to the shell A, and forms a bearing for the spindle D. In the other end of the yoke a set-screw, b, works, and has a bearing against the end of the shaft D, a copper or other soft bearing being interposed between the end of the screw and the shaft. The object of the set-screw b is to move the shaft D longitudinally, for the purpose of carrying the burr C out of contact with the burr B when running idly. A drive-pulley, V, is secured on the spindle D between the ends of the yoke d and communicates motion to the pulley V' on the cutter-head shaft through a belt, W.

At a point, S, on the shell of the mill a ring, s, is removably secured. The ring s preferably consists of a metallic bar bent or cast in circular form, the ends being bent upwardly just before meeting, forming shoulders, as shown at s', which, by their bearing against the shell, serve to retain the ring in a horizontal position. The ends of the bar forming the ring may be secured on a bolt extending through a socket on the side of the shell, or in any other approved manner. The ring is adapted to hold a basket or other receptacle in a convenient position for placing the contents in the hopper.

It is evident that slight changes might be resorted to in the form and arrangement of the several parts described without departing from the spirit and scope of our invention; hence we do not wish to limit ourselves strictly to the construction herein set forth; but, Having fully described our invention, what we claim as new, and desire to secure by Letters Patent, is—

1. In a grinding-mill, the combination, with a spindle, a feeding-hopper, and a pair of burrs, of a shaft, the cutter-head secured on said shaft and located in the channel leading from the feed-hopper to the burrs, and adapted to subdivide the ears of corn preparatory to grinding, and a device connecting the spindle and shaft, whereby they operate simultaneously, substantially as set forth.

2. In a grinding-mill, the combination, with a spindle, a hopper, and a pair of burrs, of a shaft carrying a cutter-head, the latter being located in the channel leading from the feed-hopper to the burrs, said cutter being driven by the burr-spindle, and adapted to act both as a corn-cutter and a feed-regulator, substantially as set forth.

3. In a grinding-mill, the combination, with a longitudinally-movable burr spindle, an oil-box, and a plate or bar carrying an oil-cup, of a bearing located within the oil-box, and a screw connected to the bearing and plate, whereby the bearing and oil-cup are moved simultaneously.

4. In a grinding-mill, the combination, with a spindle, an outer box, the oil-box cushioned in the outer box, a bearing, and a hand-screw for adjusting the spindle and bearing, of a sliding plate or bar connected to the hand-screw, and an oil-cup attached to the sliding plate, substantially as set forth.

5. The combination, with the burr-spindle and burrs, a casing surrounding the burrs, a shaft operated by the spindle, and a cutter secured on said shaft, of the hopper and the cap yieldingly secured to the hopper, substantially as set forth.

6. The combination, with the cutter-head E and a hopper, of the cutter-head and hopper cap, spring-holder, and spring, all operating as herein set forth.

7. The combination, with the spindle, burrs, casing surrounding the burrs, and a shaft mounted on the casing and carrying cutters, of the hopper, V-shaped in cross-section, and a yielding cap secured to said hopper, substantially as set forth.

In testimony whereof we have signed this specification in the presence of two subscribing witnesses.

LEWIS B. SPROUT.
CHARLES H. SPROUT.

Witnesses:
R. M. GREEN,
E. R. NOBLE.